United States Patent [19]
Götz et al.

[11] Patent Number: 6,158,136
[45] Date of Patent: Dec. 12, 2000

[54] COORDINATE MEASURING APPARATUS WITH USER ASSIST

[75] Inventors: Klaus-Dieter Götz, Sersheim; Otto Ruck, Pfahlheim, both of Germany

[73] Assignee: Carl-Zeiss-Stiftung, Heidenheim, Germany

[21] Appl. No.: 09/264,413

[22] Filed: Mar. 8, 1999

[30] Foreign Application Priority Data

Mar. 6, 1998 [DE] Germany .................... 198 09 690

[51] Int. Cl.⁷ ................................................. G01B 5/008
[52] U.S. Cl. ................................................. 33/503; 341/20
[58] Field of Search ..................... 33/503, 702; 341/20, 341/24; 345/161

[56] References Cited

U.S. PATENT DOCUMENTS

| | | | |
|---|---|---|---|
| 4,769,763 | 9/1988 | Trieb et al. | 33/503 |
| 5,228,356 | 7/1993 | Chuang | 341/20 |
| 5,347,723 | 9/1994 | Russell | 33/503 |
| 5,434,803 | 7/1995 | Yoshida | 33/503 |
| 6,002,351 | 12/1999 | Takeda et al. | 341/20 |

FOREIGN PATENT DOCUMENTS

| | | | |
|---|---|---|---|
| 0252212 | 1/1988 | European Pat. Off. | |
| 482672 | 4/1992 | European Pat. Off. | 33/503 |
| 2-261817 | 11/1991 | Japan | 33/503 |
| 2298931 | 9/1996 | United Kingdom. | |

*Primary Examiner*—G. Bradley Bennett
*Attorney, Agent, or Firm*—Walter Ottesen

[57] ABSTRACT

A coordinate measuring apparatus measures a workpiece in accordance with a measuring sequence. The apparatus has a probe unit for scanning the workpiece and a mechanical assembly for moving the probe unit in three coordinate directions (X, Y, Z). Drives are provided for driving the mechanical assembly to move the probe unit and a manually actuable control element controls the drives. A force unit superposes a force onto the control element in correspondence to specific conditions in the measuring sequence.

21 Claims, 7 Drawing Sheets

COORDINATE MEASURING APPARATUS WITH USER ASSIST

FIELD OF THE INVENTION

The invention relates to a coordinate measuring apparatus having at least one probe unit for contacting a workpiece to be measured and a mechanical assembly via which the probe unit can be moved in the three coordinate directions. The apparatus further has several drives via which the mechanical assembly for moving the probe unit can be driven and at least one manually actuable control element with which the drives can be controlled.

BACKGROUND OF THE INVENTION

A coordinate measuring apparatus of the above kind is, for example, disclosed in European patent publication 0,252, 212 and includes a portal-shaped mechanical assembly. This mechanical assembly includes a portal which extends over a measuring table on which the workpiece to be measured is mounted. The portal can be driven by a corresponding drive in a first coordinate direction relative to the measurement table. The portal-shaped mechanical assembly additionally includes a transverse carriage in the region of the portal spanning the measurement table. The transverse carriage can be moved by a further drive along the spanned region of the portal in a second coordinate direction. Within the transverse carriage, a probe shaft is, in turn, movable in a vertical direction (that is, the third coordinate direction) by a third drive. A probe unit is provided at the end of the probe shaft for contacting a workpiece placed on the measurement or workpiece table.

A control element is provided for controlling the coordinate measuring apparatus. With this control element, the corresponding drives in the mechanical assembly shown can be controlled so that, in this way, the probe unit can be moved in all three coordinate directions.

The coordinate measuring apparatus shown has the following special features. The return force of the control element is developed by springs when the control element is deflected from its rest position. The springs pull the control element back to its rest position and the return force is always proportional to the deflected path. In this way, it is possible for the operator to deflect the control element to any extent desired. For the control element shown, the corresponding speed of the drive for the mechanical assembly in the particular coordinate measuring apparatus is usually pregiven proportional to the deflection from its rest position. For this reason, it is easily possible for the operator to generate high startup movement accelerations or braking decelerations which can lead to a rapid wear of the mechanical assembly and even to a destruction thereof.

Another characteristic of the coordinate measuring apparatus is that the probe can be destroyed when contacting a workpiece when utilizing very fine probe pins. This is so because the operator can effortlessly actuate the control element without realizing the forces acting on the probe.

In other measuring tasks, it is often required that the operator move the above-mentioned mechanical assembly in several axes simultaneously in order to move the probe unit, for example, along a scanning line arranged so as to be inclined in space. A precise control of the probe unit along this spatially-inclined direction is, however, virtually impossible with the control element of the above coordinate measuring apparatus.

SUMMARY OF THE INVENTION

It is an object of the invention to provide a coordinate measuring apparatus wherein the problem areas for a specific measuring task are detectable by the operator of the coordinate measuring apparatus.

The coordinate measuring apparatus of the invention is for measuring a workpiece in accordance with a measuring sequence. The apparatus includes: a probe unit for scanning the workpiece; a mechanical assembly for moving the probe unit in three coordinate directions (X, Y, Z); a plurality of drives for driving mechanical assembly to move the probe unit; a manually actuable control element for controlling the drives; and, a force unit for superposing a force onto the control element in correspondence to specific conditions in the measuring sequence.

The special basic idea of the invention is seen in that a force can be superposed on the control element by a force unit in correspondence to specific conditions in the course of the measurement. In this way, the special advantage is afforded that the specific conditions in the course of measurement are reflected to the control element so as to be perceivable by the operator. The operator can then be guided during the control of the control element directly via the force superposed on the control element when operating the coordinate measuring apparatus.

Similar systems are already known from the state of the art. For example, British patent publication 2,298,931 shows the use of manual control elements on which a force is superposed. These control elements are used for navigation of diverse elements. Reaction forces are superposed on the control lever which are generated when contacting virtual barriers set up in a computer program or which are generated as feedback to the signal of a force sensor which collides with a real barrier. However, it is noted that this does not relate to a coordinate measuring apparatus and therefore does not consider the specific problem areas occurring with the use of such manual control elements in a coordinate measuring apparatus.

The following is stated with respect to the coordinate measuring apparatus of the invention.

The coordinate measuring apparatus is in no way limited to the embodiments described hereinafter, but rather can assume completely different configurations.

For example, the probe unit referred to can be any desired sensor with which a workpiece can be scanned. Accordingly, the following can be, for example, provided: optical probe heads, measuring probe heads with corresponding probes, switching probe heads having corresponding probes, et cetera.

Also, the mechanical assembly can be any desired mechanical assembly. For example, in lieu of the portal configuration shown herein as exemplary, any desired configuration of the coordinate measuring apparatus can be used. For example, a stand configuration is possible wherein a vertically aligned stand can be moved along the measuring table in a first coordinate direction. In this stand, a so-called cross slide can be guided vertically in a second coordinate direction and, on this transverse slide, a measuring arm can be guided so as to be horizontally movable in the third coordinate direction. The probe unit can be attached to the end of this measuring arm.

The drives for driving the mechanical assembly can also be differently configured. For example, the drive can be a so-called friction wheel drive wherein a friction wheel is driven by an electric motor and is supported on a running surface coacting therewith. However, spindle drives, rack- and-pinion drives, et cetera can also be used.

The most varied embodiments can be considered for the control elements. Already for the form of control, there is a multiplicity of different variations. Thus, control elements can be had wherein the shift of the mechanical assembly in the particular coordinate direction is proportional to the displacement of the control element. For example, a handwheel having a rotation transducer mounted thereon or a slider with a device for measuring the slider position can be provided with the slider being displaceable linearly. The mechanical assembly can be moved in the particular coordinate direction in dependence upon the rotation position of the rotational transducer or of the slider.

In another variation of the control element, the speed or even the acceleration of the mechanical assembly is adjusted in the particular coordinate direction proportionally to the deflection of the control element out of its rest position. The characteristic of such control elements is that they are conventionally pulled back to their neutral position by corresponding return elements. Control elements of this kind are, for example, control levers which are configured as joysticks customary for present-day computers or as handwheels which are connected to corresponding rotation transducers and are always pulled back to a defined angular position via corresponding return elements.

There are various possibilities for variably superposing the force onto the control elements with the force unit. Usually, magnetically-operated elements are used as force elements in order to generate the above-mentioned force. It is here emphasized that the term "force" also includes the torque, for example, on a handwheel, because a force is also required to generate a torque. In the simplest case, this can take place with an electric motor which superposes a torque onto the control element in correspondence with the desired force.

In addition to this very simple possibility, there are also other possibilities for configuring the force element in order to superpose corresponding forces onto the control elements. For example, pneumatics are also conceivable with which the force is generated by superposing a corresponding pressure. For example, for a handwheel as the control element, two pneumatic cylinders are conceivable with each cylinder being connected via a cable to the shaft of the handwheel. The cable or rope of one cylinder can be wound on a disc in a first rotational direction and be attached to the disc with its end. The disc can be correspondingly connected to the shaft. The cable of the second cylinder would be wound on a second disc connected to the shaft in another rotational direction and be attached with its end. To apply a force, the corresponding cylinder can then be charged with a corresponding air pressure.

The control elements are operatively connected to a functional assembly group which, on the one hand, further processes signals coming from the rotational transducers of the control elements and, on the other hand, controls the superposition of force onto the control elements. This functional assembly group can be a self-contained element in the form of, for example, a controller or can comprise a plurality of individual elements which can possibly be disposed in the control or in the computer of the coordinate measuring apparatus.

Various embodiments are given as to how this force is superposed on the control element in the procedure.

According to a first embodiment, the force is superposed on the control element in proportion to the acceleration of the mechanical assembly in the particular coordinate direction. In this way, the operator of the coordinate measuring apparatus can perceive how high the acceleration is which the operator has adjusted so that, at high accelerations, the operator has a certain feel for this acceleration whether these accelerations are startup, travel accelerations or braking decelerations.

In a further embodiment, the force can be selected to be approximately proportional to the mass inertial force occurring with the acceleration of the mechanical assembly. This affords the advantage that a feel for the corresponding mass inertial forces is also provided. Referred to a coordinate measuring apparatus of the portal type, this means, for example, that the movement of the light probe shaft in the vertical direction is considerably less critical than the movement of the entire portal in the horizontal coordinate direction. This is so because the portal with the transverse carriage, the probe shaft and the probe unit of course has considerably more mass than the probe shaft with the probe unit attached thereto so that the mass inertial forces are considerably different for the same acceleration.

The force, which is to be superposed on the control element, can be determined in that, for example, the acceleration of the mechanical assembly in the coordinate directions is measured, for example, from the corresponding signals of the drives or from an acceleration sensor mounted in the region of the probe unit and, as required, is multiplied by the masses of the mechanical assembly. These masses are those which are to be accelerated in the particular coordinate direction.

In a considerably simpler embodiment, the acceleration and braking performance of the mechanical assembly of the coordinate measuring apparatus can be simulated by a corresponding differential equation in the particular functional assembly group so that no data need be recorded with respect to the actual acceleration of the mechanical assembly or the probe unit.

The acceleration or the mass inertial force can even be simulated in the simplest way without any computation for a control element wherein the displacement of the mechanical assembly in the particular coordinate direction is proportional to the displacement of the control element. This is done in that the control element is directly coupled to a mass to be accelerated (a flywheel mass) which is accelerated with the actuation of the control element and therefore works as a force unit. This has the special advantage that no complex element has to necessarily be provided in the control element which superposes the force because the force is generated by the acceleration of the particular mass.

The mass can either be rigidly connected to the control element or be connected via a gear assembly to the control element. For the case wherein the mass is rigidly connected to the control element, the mass can, for example, be a disc which is attached to the shaft of the handwheel.

If the mass is connected to the control element via a gear assembly, then this mass can be moved either linearly (in that a gear wheel is attached to the shaft of the handwheel which engages in a corresponding toothed rack on which the mass is attached) or the mass is rotated whereby the gear wheel, which is attached to the shaft of the handwheel, engages in a corresponding gear wheel connected to a flywheel mass.

In a second embodiment, the superposition of the forces onto the control elements can also be used in order to encourage the operator of the coordinate measuring apparatus in a simple manner to move the probe unit in a desired direction deviating preferably from the coordinate directions. For this purpose, usually at least one control element or two control elements are provided with which the probe unit can be controlled in at least two different coordinate directions. The force is then so superposed on the control element(s) that at least one preferred direction results in which the control element(s) is preferably actuated.

The preferred direction is used to make a movement of the probe unit possible in at least one defined traveling direction. For a deflection of at least one control element, the function assembly group superposes the force on the control element (s) in correspondence to the deflection in such a manner that a constant ratio between the deflections of the control element(s) for the different coordinate directions results corresponding to the preferred direction.

To make the above clear, this procedure will now be described with respect to an example of an embodiment. If the probe unit is to be moved, for example, at an angle in the X—Y plane, then, for deflection of the control element in the X direction, a force is automatically superposed onto the control element for the Y direction so that the control rod, for deflection in the X direction, is displaced automatically by an amount in the Y direction without any participation by the user. This amount is selected proportional to the deflection in the X direction. This technique is especially advantageous for different measurement tasks in the coordinate measuring apparatus.

For example, optical probe heads can be attached in coordinate measuring apparatus to a so-called rotational pivot unit. The rotational pivot unit can then align the optical probe head in space as desired. Usually, however, the workpiece surface of the workpiece to be scanned is not in the measuring region of the scanning beam during manual operation of the coordinate measuring apparatus so that the probe head must be moved to the workpiece surface or away from the workpiece surface along the probe beam which is possibly aligned inclined in space. According to this embodiment, it is therefore especially advantageous to select the preferred direction so that the probe head is moved along the scanning beam of the optical probe head.

In a second possibility of use, a preferred direction is worked with in order to make possible a traveling direction of the probe unit which deviates from the coordinate directions of the coordinate measuring system of the machine. This second possibility of use can result when the workpiece coordinate system is rotated relative to the machine coordinate system. Conventionally, coordinate measuring apparatus can only be driven in the coordinate directions (X, Y, Z), that is, in the machine coordinate system. Often, it is, however, necessary to move the probe not exactly parallel to the coordinate directions but in other respective directions. One can imagine, for example, a cube which is tipped at one of its side edges by 30° and one would like to move precisely parallel to the side surfaces of the cube when operating the control element. For this case, it is especially advantageous to adjust the preferred directions in such a manner that the probe unit can be moved correspondingly to the tilted workpiece coordinate system when operating the control elements in the corresponding direction. The preferred direction is then so selected that the probe unit can travel along the axes of a coordinate system (the workpiece coordinate system) rotated relative to the coordinate directions pregiven by the mechanical assembly.

In another embodiment, in which a preferred direction is pregiven, the operator is guided during scanning. There are situations wherein it is a very great advantage for the user when the user is actively assisted by the coordinate measuring apparatus when there is contact. For a switching probe head, the problem can, for example, occur that the user has contacted the workpiece at locations which are accessed only with difficulty. For this reason, the probe has been lifted up out of its bearing location and the user cannot tell which is the correct direction in order to lift the probe again from the workpiece surface. In the worst case, this can lead to a breakage of the probe when the probe, for example, is in a bore. It is therefore especially advantageous in this case to select the preferred direction in such a manner that the probe head is moved to its last valid contact position when actuating the control element in the preferred direction. It is known of this position that the probe is lifted out of its bearing position but that the probe is not in danger of breaking. From here, one has a good start position for a new attempt to remove the probe from the workpiece surface. If this attempt is again unsuccessful, then one can return to this start position again via the superposed preferred direction. The preferred direction should only be superposed as long as the bearing locations are open and the probe is therefore deflected out of its rest position. The bearing positions detect a contact engagement. As soon as the contact is again closed, there is no necessity to actively operate on the travel path because the probe is then moved free. This contact is defined by the bearing positions.

The situation described below can occur in another embodiment having a preferred direction for which a measuring probe head is used in the coordinate measuring apparatus. After the probe makes contact on the workpiece surface, the coordinate measuring apparatus switches over to a control mechanism which applies a defined measuring force on the workpiece surface in the scanning direction. The measuring force is either applied by electromagnetic linear motors or via spring forces which are generated via corresponding springs in the probe head by the deflection of the probe relative to the probe head. In this way, the probe head therefore always applies a defined force on the workpiece surface in the scanning direction. If the operator, however, now moves the coordinate measuring apparatus perpendicularly to the surface of the workpiece, it can happen that the probe becomes, for example, stopped at an edge or at a steep ramp and the deflection of the probe relative to the probe head, and therefore also the forces working parallel to the workpiece surface, become greater. For a very fine probe having a probe ball diameter of, for example, less than 1 mm, this can lead to destruction of the probe. In order to prevent this, it can therefore be advantageous to select the preferred direction in the contacted state in proportion to the measuring forces which act perpendicularly to the probe direction.

According to a third embodiment of the invention, it can be advantageous to transmit to the operator of a coordinate measuring apparatus data as to the control element which are specific to the measuring task.

A first configuration of this third embodiment could comprise that, for a coordinate measuring apparatus (wherein a switching probe head having a probe is used as a probe unit), a so-called pressure point is generated as a stop by superposing the forces onto the control elements. This pressure point indicates to the operator of the coordinate measuring apparatus when the optimal scanning speed is reached for the particular probe.

In another variation wherein a measuring probe head is used as a probe unit, a slight deviation can be superposed on the control element in the scanning direction which shows the operator in which direction the workpiece surface has been contacted. The control coordinate apparatus is in a control loop in the particular direction and the deviation of the control element in the particular direction therefore remains without effect. For this reason, this particular deflection is not a hindrance.

In another variation, a light tapping on the control lever can draw attention to a control element which the operator of the coordinate measuring apparatus would like to move but for which the movement should not be possible.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
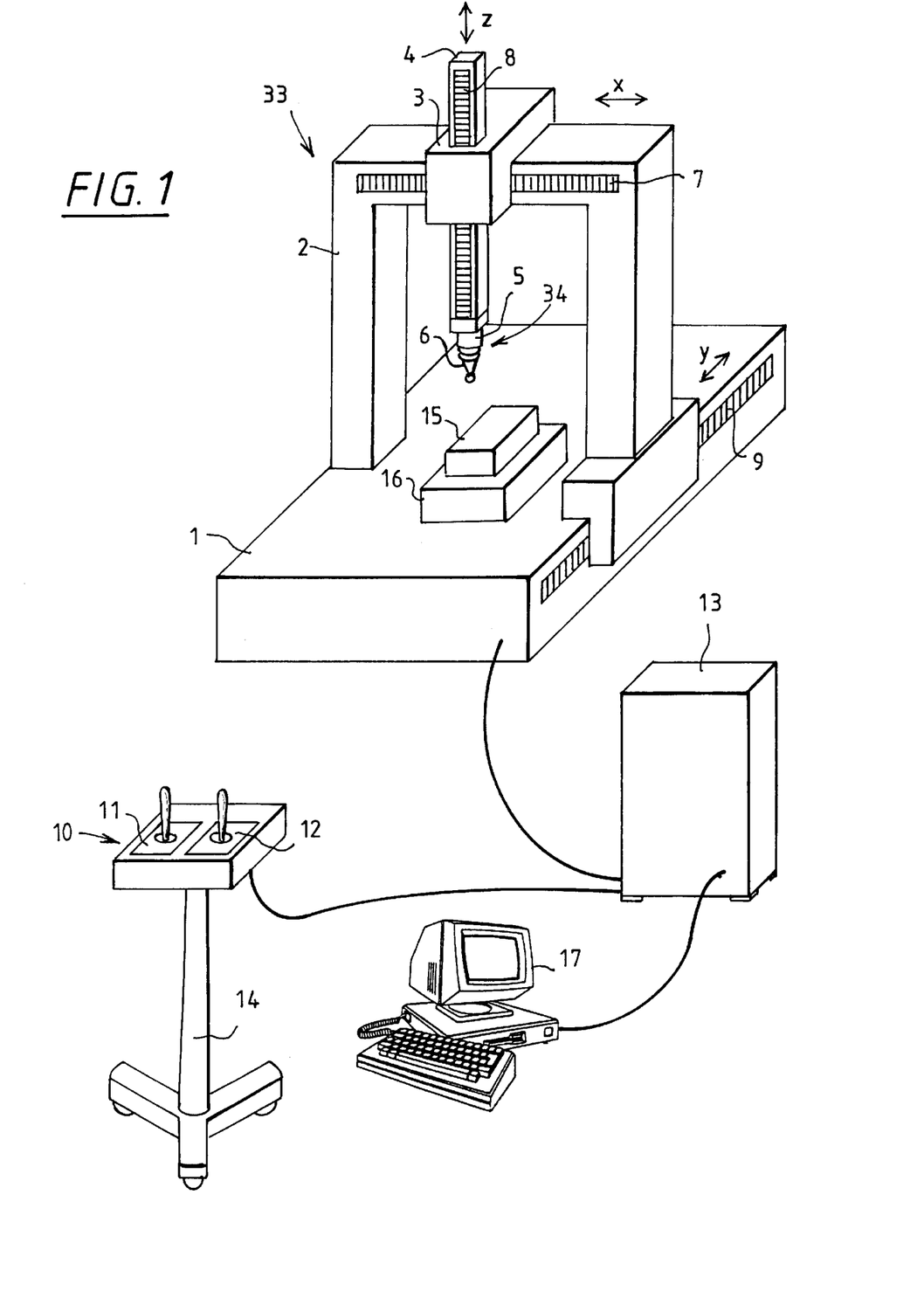
FIG. 1 is a schematic perspective view of a coordinate measuring apparatus of the portal type which can be controlled via control elements (11, 12)

FIG. 1 shows a coordinate measuring apparatus according to the invention. As shown in FIG. 1, a workpiece 15 to be measured is disposed on a pallet 16 which, in turn, is clamped to a measuring table 1 of the coordinate measuring apparatus. For measuring the workpiece 15, a probe unit 34 is movably guided on a mechanical assembly 33. The probe unit 34 includes a probe head 5 and a probe 6. The mechanical assembly 33 is exemplary and includes a portal 2, a transverse carriage 3 and a probe shaft 4. The portal 2 is movable in a first coordinate direction along arrow y via corresponding guides on the measuring table 1. The portal 2 is movably journalled via corresponding bearings (not shown) and can be moved in the direction of the arrow y via a corresponding wheel drive which is supported on the measuring table 1. For measuring the precise machine position, an optical probe is provided in the portal 2 and scans an incremental scale 9. In the same way, the transverse carriage 3 is movably journalled on the part of the portal 2 which spans the measuring table 1 in a second coordinate direction identified by x. A friction wheel drive is provided for movement in the direction of arrow x and an optical probe scans the precise position of the incremental scale 7 in the direction of arrow x. The probe shaft 4 is movably journalled in the direction of arrow z in the third coordinate direction. Corresponding drives can drive the probe shaft 4 in the direction of arrow z. An optical probe is likewise arranged in the transverse carriage and scans the precise position of the scale 8.

A coordinate measuring apparatus configured in this manner is usually controlled via data. The probe head 5 is so driven by the mechanical assembly 33 that the probe 6 contacts the workpiece to be measured at corresponding points pregiven by the data. In an alternative, the control of the drives of the mechanical assembly 33 can however take place via the shown control elements (11, 12) which are here shown exemplary on a control panel 10. The control panel 10 can be moved via a movable roller-mounted support 14 in the region of the coordinate measuring apparatus. The control panel 10 is operatively connected to the control 13 which constitutes the connecting member to the drives and sensors of the coordinate measuring apparatus. An evaluation computer 17 is additionally connected to the control 13.

The drives of the mechanical assembly 33 can be controlled by the manually actuable control elements (11, 12) as described above. The control elements (11, 12) are so configured that forces can be superposed thereon by a force unit in correspondence to specific characteristics during the measurement sequence. This will be explained in detail with respect to FIGS. 2 and 3.

Figure 2:
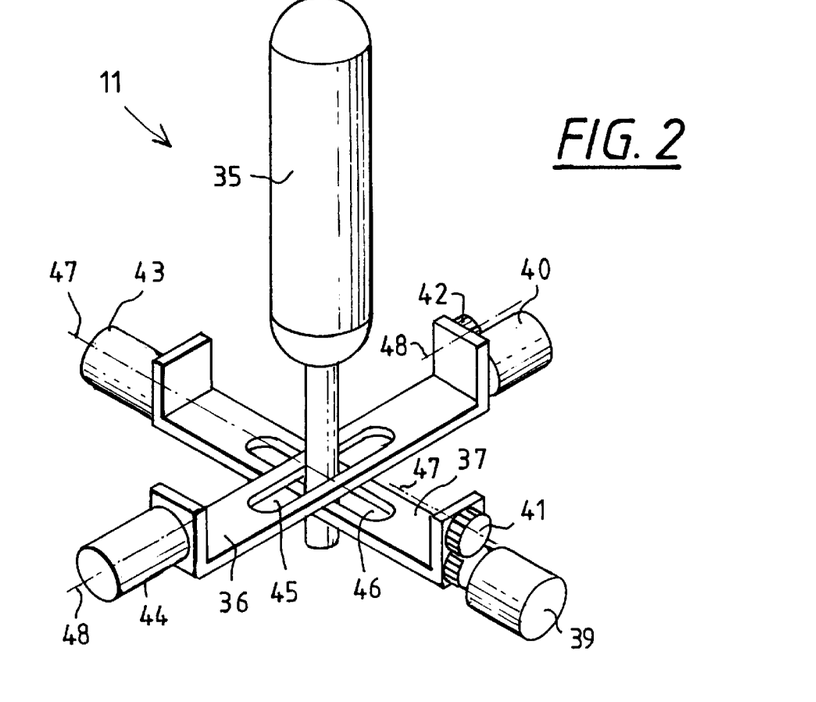
FIG. 2 shows a control element in the form of an actuating lever for use as control element (11) in the subsequent circuits.

FIG. 2 shows a control element 11 according to FIG. 1. The control element includes a joystick or rod-like handle 35 having a lower end which is guided through respective slots 45 and 46 of two rotatably journalled elements (36, 37). The rotatably journalled elements (36, 37) are rotatably movably suspended about the rotational axes (47, 48). The lower end of the control rod 35 is likewise movably accommodated so that, for a deflection of the control rod 35 from its rest position, the elements (36, 37) are rotated about the axes (47, 48) so that the rotation transducers (43, 44) detect a corresponding rotation of the elements (36 or 37) and output a corresponding signal to the control of the coordinate measuring apparatus. The rotational transducers (43, 44) are configured as electrical potentiometers but can also be configured differently, for example, as optically operating rotational-angle measurement devices. The control rod 35 is additionally always pulled into the rest position shown in FIG. 2 via springs which are not shown in greater detail. To superpose additionally corresponding forces on the control lever, gear wheels (41, 42) are mounted at the other ends of the elements (36, 37) in the region of the rotational axes (47, 48). The above-mentioned force units are in the form of electric motors (39, 40) and engage in the gear wheels (41, 42) via gear wheels mounted on the electric motors. A voltage is applied to the electric motors (39, 40) by a function assembly group which is here configured exemplary as controller 22 which will be explained in greater detail hereinafter. With the voltage, the corresponding torque of the electric motors (39, 40) is transmitted via the gear wheels (41, 42) and the elements (36, 37) to the control lever 35.

Figure 3:
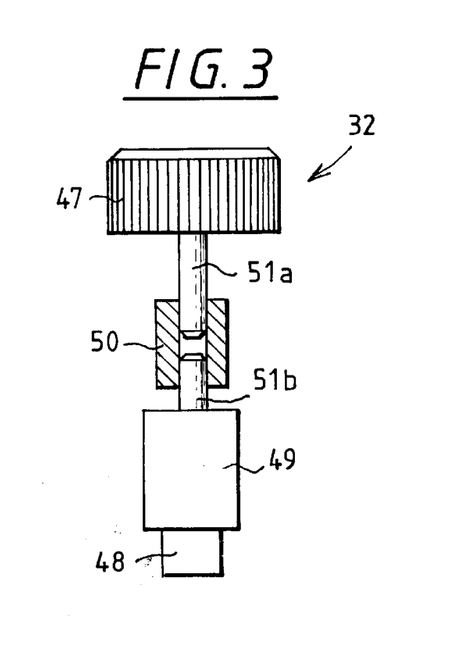
FIG. 3 is a control element (32) having a handwheel (47) for use in subsequent circuits and is an alternative to the control element (11) of FIG. 2.

FIG. 3 shows an alternate control element 32 which is likewise used often to operate coordinate measuring apparatus. The control element includes a handwheel 47 which is connected via shafts (51a, 51b) to an electric motor 49 and a rotation transducer 48. The handwheel 47 is provided for manual actuation and the electric motor functions as a force unit. The control element 32 additionally has a friction clutch 50 to prevent an over-rotation in the end stop position and therefore damage to the rotation transducer 48. The friction clutch connects the two shaft halves (51a, 51b) via a ring to each other. The ring is connected friction-tight to the end of shaft half 51a as well as to the end of shaft half 51b.

The actual position of the handwheel 47 is read out via the rotation transducer 48 in the same manner as in the control element shown in FIG. 3; whereas, a force can be superposed via the electric motor 49 onto the control element in correspondence to the specific characteristics in the measuring sequence.

The control element of FIG. 3 is distinguished by the fact that a rotatable handwheel 47 is used as an input medium and especially by the fact that this is a control element wherein the mechanical assembly 33 of the coordinate measuring apparatus is moved in the corresponding coordinate direction proportional to the rotational position of the handwheel. This is in contrast to the control element of FIG. 2 wherein the control element pregives a speed in the corresponding coordinate direction in correspondence to the deflection of the control rod 35.

Figure 4:
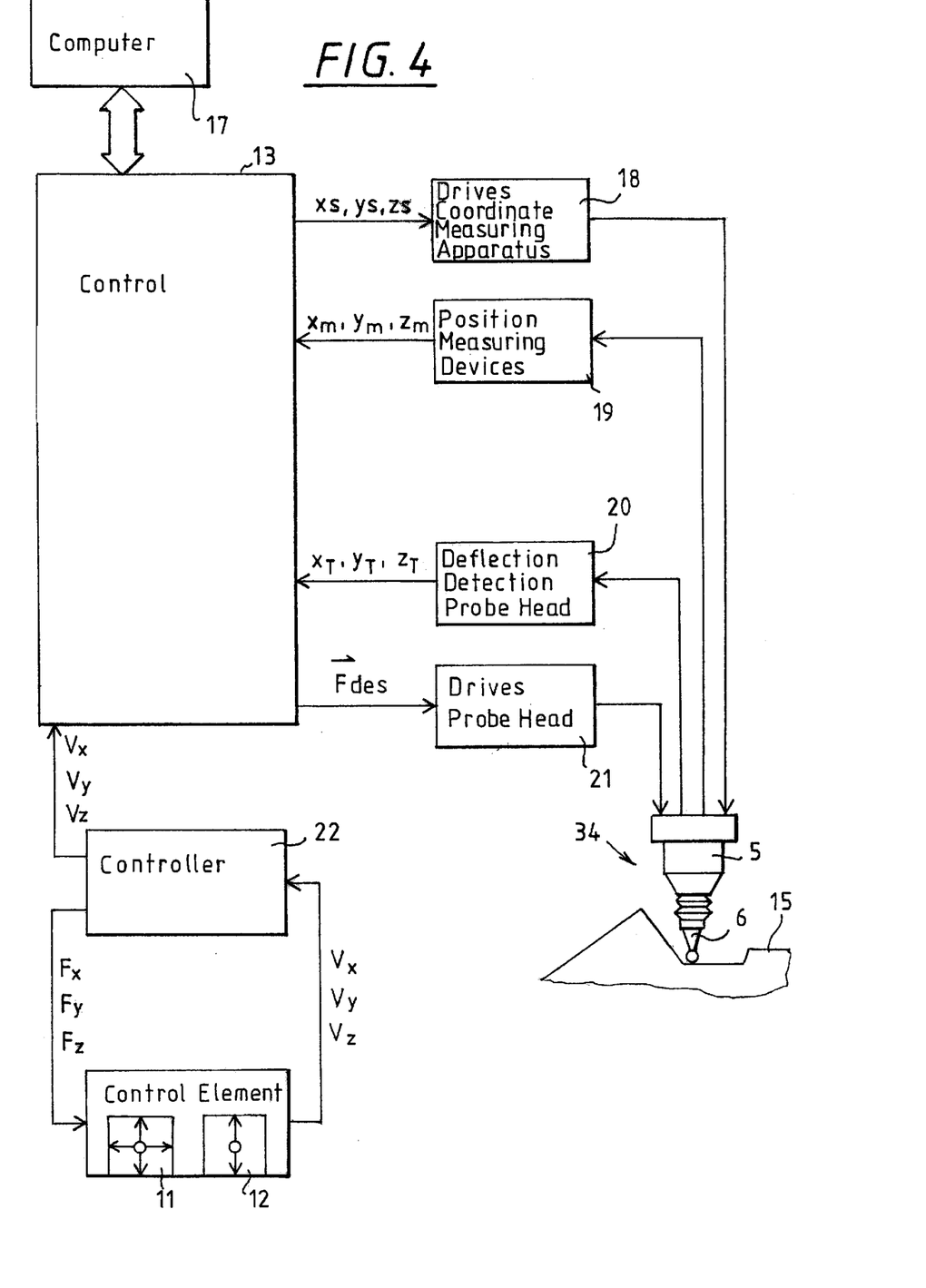
FIG. 4 is a block diagram of a control unit for a coordinate measuring apparatus wherein a force proportional to the mass inertial force of the moved mechanical assembly is superposed on the control elements (11, 12)

A first embodiment of the control circuit for a coordinate measuring apparatus is shown in FIG. 4. As already described in connection with FIG. 1, the probe unit 34 must be moved correspondingly in the coordinate directions (X, Y, Z) for contacting a workpiece 15 so that the probe 6 contacts the surface of the workpiece 15. For this purpose, a signal (here identified by Vx, Vy, Vz) is outputted by the control elements (11, 12) in correspondence to the deflection out of the zero position in the corresponding coordinate direction to an electronic controller 22 of the control elements. The controller 22 serves as an electronic interface between the control elements (11, 12) as well as the control 13 of the coordinate measuring apparatus. The controller 22 receives the signals (Vx, Vy, Vz) supplied by the transducers of the control elements and converts these signals into corresponding signals which are identified for the sake of simplicity also by (Vx, Vy, Vz). These converted signals (Vx, Vy, Vz) are transmitted to the control 13.

At this point, it should be noted that the control 13 is connected only via schematically shown lines to the controller 22. The connection of the controller 22 to the control is realized via logic data channels, for example, a LAN connection or an interface RS232.

The control derives signals (Xs, Ys, Zs) based on the signals (Vx, Vy, Vz). On the basis of these signals (Xs, Ys, Zs), the drives 18 of the mechanical assembly are driven and the mechanical assembly 33 of the coordinate measuring apparatus is correspondingly driven in the coordinate directions. The actual position of the probe unit 34 (the so-called apparatus position Xm, Ym, Zm) is determined via optical probe heads as described above. These optical probe heads scan corresponding scales (7, 8, 9) in the three coordinate directions. The measuring devices are identified by reference numeral 19 and are referred to as position measuring devices.

In addition, the probe unit 34 is configured as a measuring probe head 5 by way of example. Here, the probe 6 can be continuously deflected relative to the probe head 5 in all three coordinate directions. The deflection of the probe 6 relative to the probe head 5 is detected by measurement value detection devices 20 which detect the deflection of the probe 6 in each of the three coordinate directions. The particular measured deflection in the three coordinate directions is identified by (XT, YT, ZT) as probe deflection. In addition, the probe head includes so-called measurement force generators 21 which can superpose a defined measuring force onto the probe 6 in correspondence to an input $\vec{F}_{des}$.

The item of special interest in the coordinate measuring apparatus shown in FIG. 4 is seen in that the control elements known until now functioned completely independently of the mass inertial forces which occur with the acceleration of the individual parts of the mechanical assembly 33. If the operator therefore makes rapid changes of the control elements (11, 12) to move the probe unit 34, then this can have the consequence that the resulting high accelerations cause deformations or even destruction of the mechanical assembly 33. In order to alleviate this problem, the force with which the control elements (11, 12) is charged, is selected approximately proportional to the mass inertial force occurring with the acceleration of the mechanical assembly 33 in the circuit of FIG. 4. This is shown as an example with respect to FIG. 1 in connection with a displacement of the portal 2 in the coordinate direction of arrow y. To shift the portal 2, the operator must move the control element 11 in the corresponding direction. With a deflection of the control element 11 out of the rest position, the portal is however first accelerated until the desired speed is reached. Even when braking the portal until it comes to standstill at its final desired position means a deceleration of the portal 2 and triggers mass inertial forces. In order to prevent the operator from exceeding the maximum permissible mass inertial forces, a force Fy is superposed upon the particular control element 11 which is selected to be approximately proportional to the mass inertial force occurring when there is an acceleration of the portal 2 or the mechanical assembly 33. The force Fy is opposite to the deflection of the control element. In this way, the user is given a feeling for the actual mechanical assembly to be accelerated, so that, in this way, the user can avoid accelerations which are too great.

The acceleration, which is experienced by the mechanical assembly because of the drive of the mechanical assembly in the corresponding direction, is generated in the embodiment of FIG. 4 by a simulation of the controller. The particular acceleration can also be derived from the drive data (Xs, Ys, Zs) or from an acceleration sensor which is attached preferably in the region of the probe unit 34 in the mechanical assembly of the coordinate measuring apparatus. The mass inertial force is then computed by a multiplication of the acceleration with the mass of the mechanical assembly accelerated in the particular coordinate direction. A signal (Fx, Fy, Fz) is superposed upon the control element (11, 12) proportional to the mass inertial force whereby the particular control element (11, 12) generates an opposite force which can be felt by the operator. The mass corresponds in the example shown for a movement in the direction of arrow y to the mass of the portal 2 with all components which are attached hereto such as drives, transverse carriages, probe shafts, probe units, et cetera.

The embodiment of FIG. 4 is shown here strictly as exemplary for a control element according to FIG. 2. It is understood, however, that the control element 32 of FIG. 3 can also be utilized. Here too, a counter torque is superposed upon the control element via the electric motor 49 and is proportional to the mass inertial force occurring with the acceleration of the mechanical assembly 33.

Figure 5:
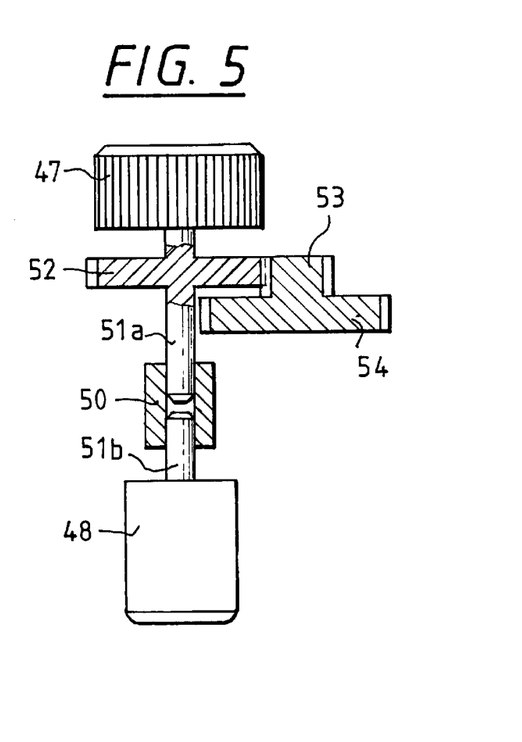
FIG. 5 is a schematic of a control element modified with respect to FIG. 3 and which is especially provided for use in a circuit according to FIG. 4; and, FIGS. 6 to 9 show different circuits for coordinate measuring apparatus wherein a preferred direction is set when operating at least one control element.

FIG. 5 shows a very simple control element wherein the force, which is to be superposed upon the control element, can be even superposed without the motor shown below. Here, the control element is simply coupled to a mass 54 which must likewise be accelerated when actuating the control element. The control element is essentially configured precisely as the control element of FIG. 3. As a difference with respect to the electric motor 49, however, the control element is connected to a rotatable fly disc 54 which must be accelerated when actuating the handwheel 47. For this purpose, the mass 54 is connected via a gear assembly including the gear wheels (52, 53) so that the rotational frequency of the handwheel 47 is translated into a considerably higher rotational frequency of the mass 54 to be accelerated. The arrangement shown has the special advantage that the mass 54, which is to be accelerated, can be exchanged variably for other corresponding masses so that the handwheel, after an electronic switchover, can also be used for different coordinate directions of the mechanical assembly 33 of the coordinate measuring apparatus. If the handwheel is, for example, used to shift the probe shaft 4 in the direction of the arrow Z, then a disc 54 is used with considerably lower mass than for the case when the control element is used to move the entire portal 2 for the coordinate direction y.

Typical mass inertial torques, which are superposed on the handwheel 47 by the disc 54 in connection with the gear assembly, can have a value of typically greater than $1 \times 10^{-3}$ kg m$^2$.

It is not necessary that the control element be configured as in FIG. 5; instead, a gear rack with a mass attached thereto can be provided in lieu of a rotatable disc 54 and the gear wheel 53 so that the gear wheel 52 converts the rotational movement into a linear movement of a mass to be accelerated. The disc 54 can also be attached directly to one of the shaft halves (51a, 51b) so that the additional gear assembly (52, 53) and a rotatable bearing for the rotatable disc 54 become unnecessary. Such a control element, however, has the disadvantage that it is relatively inflexible and must be manufactured especially for a direction of movement of a special coordinate measuring apparatus.

A second variation will now be discussed in connection with FIGS. 6 to 9 wherein forces are so superposed upon a control element (corresponding to specific conditions in the measurement sequence) that at least one preferred direction results when operating the control elements in which the control elements can be preferably operated.

Figures 6, 6A:
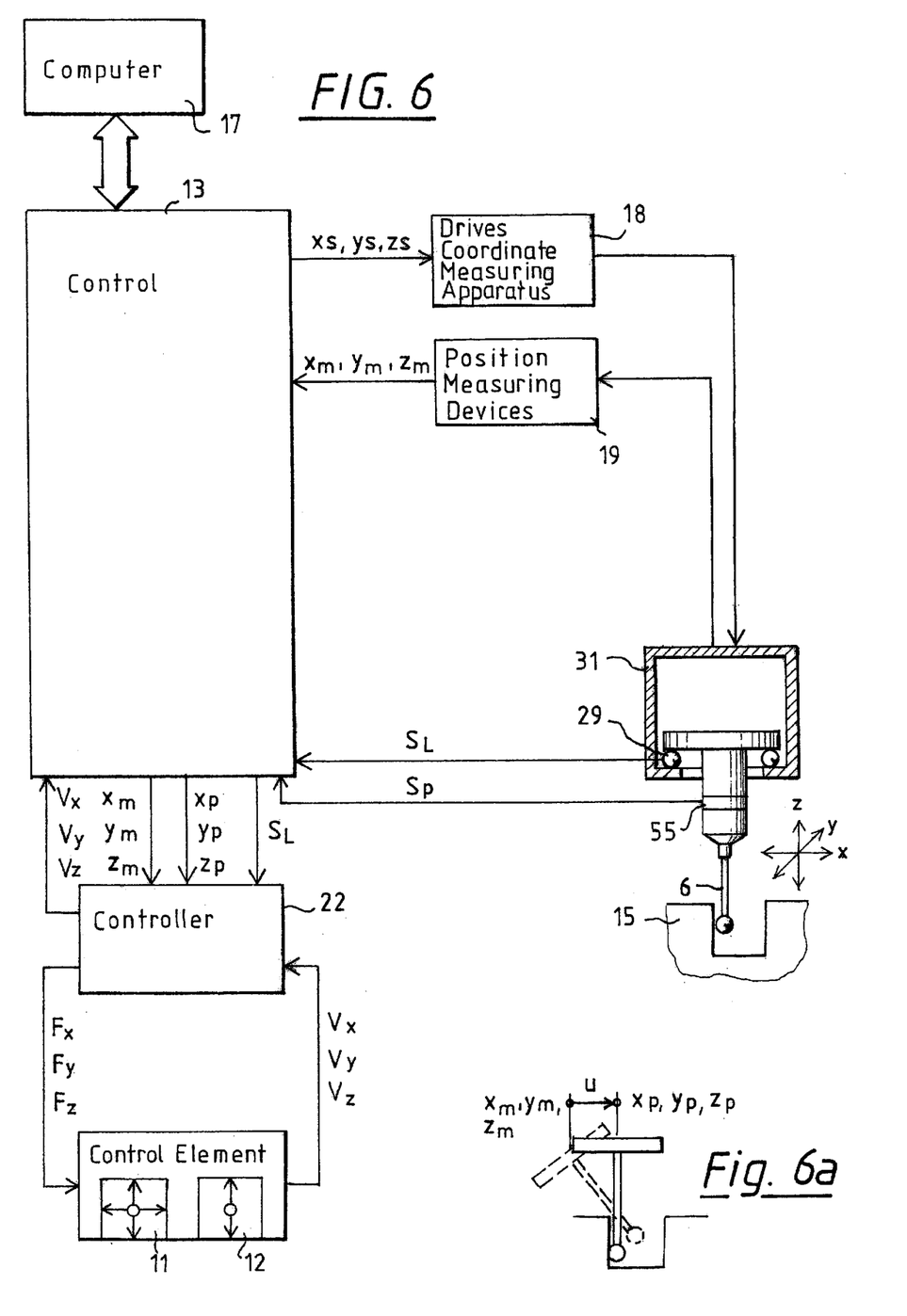

In a first embodiment of this second variation of FIG. 6, a coordinate measuring apparatus is shown, wherein the probe unit is especially configured as a so-called switching probe head 31. The common characteristic of switching probe heads is here seen in that the probe 6 is lifted out of its bearing positions 29 relative to the probe head 31 when the probe 6 contacts a workpiece 15. The probe 6 is journalled in the bearing positions 29 on the probe head 31 and an interruption of the electric contact takes place when the probe 31 is lifted out of its bearing locations 29. A signal SL is outputted to the control 13 because of the interruption of the electric contact. Because of this, a contacting of the workpiece by the probe 6 is recognized as valid. In a first solution, and simultaneously with the signal, corresponding machine positions (Xm, Ym, Zm) are assumed as valid contact positions (Xp, Yp, Zp). The machine positions (Xm, Ym, Zm) are measured by the position measuring units 19.

In a refined solution of switching probe heads, a piezo crystal 55 is provided additionally in the probe head 6 for increasing accuracy. The piezo crystal 55 outputs an electric signal SP to the control 13 already for the slightest touching of the workpiece by the probe 6 long before the probe 6 is lifted out of its bearing positions 29. Because of the electric signal SP, the machine positions (Xm, Ym, Zm) are frozen. Only when the probe 6 is lifted out its bearing position 29, is the contact deemed to be valid and the frozen machine position are assumed as contact positions (Xp, Yp, Zp). This method affords the additional advantage compared to the first-described method in that considerably more accurate contact points are obtained.

What is special for switching probe heads is that with these probe heads it cannot be determined accurately in which direction the probe 6 is deflected relative to the probe head 31. If the operator of the coordinate measuring apparatus has to measure a location, which is difficult to access with the probe 6 (for example, a spatially inclined bore), it can often be problematic for the operator to again withdraw the probe from the bore without breaking the same. FIG. 6a shows this in detail. If the probe head 31 is moved further to the left to the machine position (Xm, Ym, Zm) from the last valid contact position (Xp, Yp, Zp), then the deflection of the probe 6 increases until the probe is possibly destroyed. According to the configuration of FIG. 6, it is therefore suggested to adjust the force acting on the control element so that the preferred direction, which results therefrom, is always in the direction toward the position of the probe head in its last valid contact position. This is done until the switching contact is again closed and the probe is therefore no longer deflected out of its rest position. In this way, the operator can be guided via the control elements so that the operator can always move the probe head again into that position in which the switching contact of the switching probe head had opened. In this way, the operator can always be guided to this defined position via the superposition of the preferred direction and the operator is ensured that the probe pin does not break off. The preferred direction is only superposed until the probe 6 again lies in its bearing positions 29 and therefore the switching contact, which was open during the contact, is again closed. Now, no danger is present that the probe can break off.

This procedure in the control of the coordinate measuring apparatus is realized by proceeding as described below.

As already mentioned above, a signal SL is transmitted to the control 13 when the probe 6 is lifted out of its bearing positions 29. For this, the machine positions (Xm, Ym, Zm), which are used in dependence upon the method, are stored as actual contact positions (Xp, Yp, Zp). These actual contact positions (Xp, Yp, Zp) are stored in the control 13 and likewise transmitted via a corresponding line to the controller 22. Furthermore, the signal SL is also transmitted from the control 13 to the controller 22. The signal SL transmits further the opening of the switch contact. Furthermore, the actual machine positions (Xm, Ym, Zm) are likewise transmitted via a corresponding line to the controller 22. If the signal SL is at the controller 22, that is, the probe 6 is lifted out of its bearing positions 29 at the probe head 31, a vector $\vec{U}$ is provided from the actual machine positions (Xm, Ym, Zm) and the last valid contact position (Xp, Yp, Zp) as shown in FIG. 6a. This vector $\vec{U}$ reflects nothing more than the deviation of the probe head 31 from the last valid contact position (Xp, Yp, Zp). Corresponding to the direction and the length of this vector $\vec{U}$, a force, as mentioned above, is superposed on the control elements which is opposite to the deflection so that the control elements can apply a force to the operator in opposition to this direction. In this way, the operator can always return to the last measured contact position (Xp, Yp, Zp) until the probe 6 again comes to rest in the bearing positions 29 and, in this way, the signal SL again has its zero position.

Figure 7:
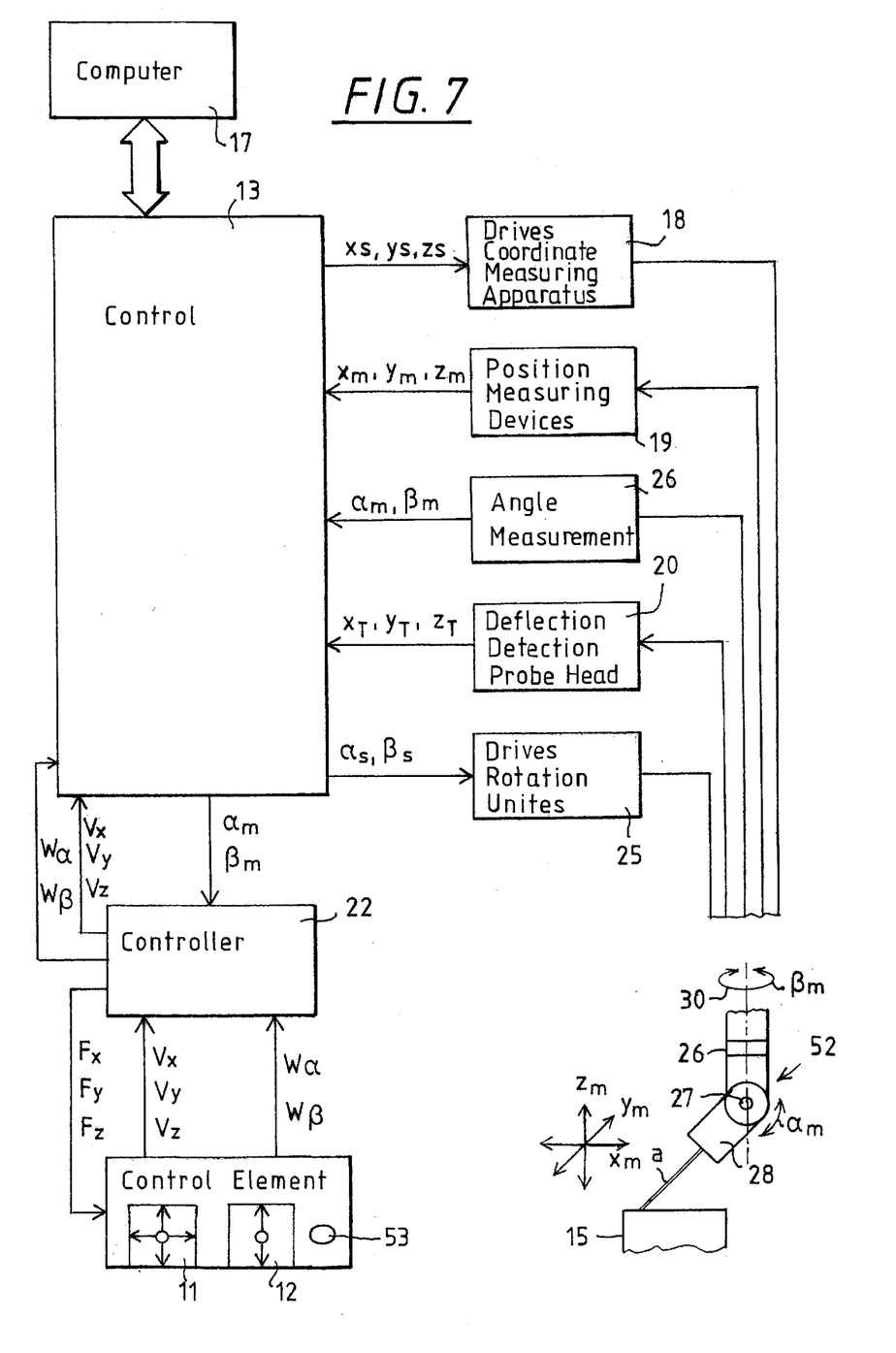

FIG. 7 shows another embodiment wherein a preferred direction results when operating the at least one control element. In the control mechanism (FIG. 7a), an optical probe 28 is used which, as is conventional in coordinate measuring apparatus, is attached to a so-called rotation-pivot unit 52 so that the scanning beam (a) can be aligned as desired in space. For this purpose, the rotation-pivot unit 52 has a rotation unit 26, with which the optical probe 28 can be rotated about a first axis in accordance with arrow am, as well as a second rotation unit 27 with which the optical probe head 28 can be likewise rotated about a second rotational axis, which is perpendicular to the first rotational axis. The optical probe head 28 is here rotated along the arrow βm so that the probe head 28 can be aligned in space as desired. Probe heads of this kind usually scan the surface of the workpiece 15 to be measured with the scanning beam (a). In manual operation, it is in practice very difficult to position the optical probe head in such a manner above the surface of the workpiece to be measured that the workpiece surface is located precisely in the measuring region of the scanning beam (a). It is therefore desirable to either move the probe head closer to the workpiece surface or to move the probe head away from the workpiece surface. If the rotational-pivot unit 52, however, exhibits any desired spatially inclined alignment, then it becomes difficult for the operator of the coordinate measuring apparatus to actuate the drives 18 thereof so that the optical probe head 28 is moved precisely in the alignment of the scanning beam (a). For this reason, a force is superposed upon the control elements in the embodiment of FIG. 7 so that the preferred direction (which results when actuating the control element in the preferred direction) is so selected that the optical probe head is moved along the scanning beam (a). For this purpose, the rotation positions ($\alpha$m, $\beta$m) of the rotation joint 27 of the rotation-pivot unit 52 are transmitted from the angular measuring unit 26 via the control 13 also to the controller 22. The angle measuring unit 26 measures the rotational positions ($\alpha$m, $\beta$m) of the rotation joint 27 of the rotation-pivot unit 52. In the controller 22, the precise alignment of the scanning beam (a) is derived from the two rotational angles ($\alpha$m, $\beta$m) and, in this way, corresponding forces (Fx, Fy, Fz) are superposed upon the control elements (11, 12) so that, for an actuation of the control elements (11, 12), a preferred direction automatically results along the probe beam (a) along which the probe head can be moved. The preferred direction deviates, as required, from the coordinate directions.

A distinction should be mentioned with respect to the control elements (11, 12). The control elements (11, 12) are arranged on the control panel and a key 53 is additionally arranged thereon. With the key 53, the control in the coordinate measuring apparatus can be switched over from the drives 18 to the drives 25 of the rotation units (26, 27) of the rotation-pivot unit. In the depressed state of this key, therefore, the rotation unit 26 as well as the rotation unit 27 can be operated by the control element 11 in the same manner as the drives 18. This corresponds to the angle speeds (Wu, We). The signals W$\alpha$ and W$\beta$ are then converted to signals $\alpha$s and $\beta$s according to which the drives 25 of the rotation units are displaced.

Figure 8:
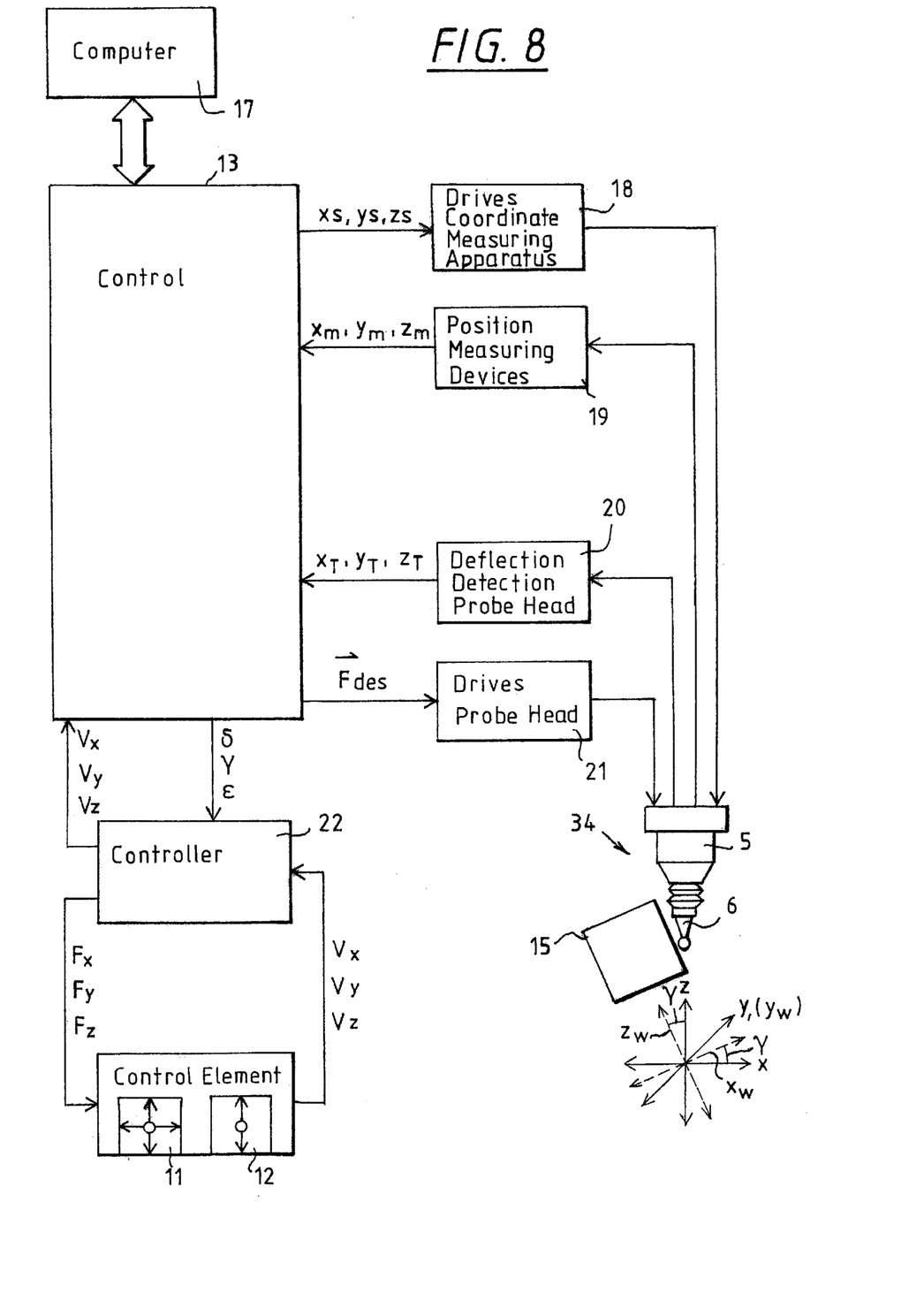

In FIG. 8, a third variation of the second embodiment is shown, wherein a preferred direction results along which the probe unit is moved when the at least one control element is operated. This preferred direction deviates from the coordinate direction.

For this purpose, it is further noted that the particular circuit shows the probe unit 34 as measuring probe head 5 with corresponding probe 6. In lieu thereof, any desired probe head such as an optical probe head for example, switching probe head, et cetera can be used. The functional assembly groups (18 to 21) which are described for the measuring probe head, have already been described with respect to FIG. 4 so that it is not necessary to again provide a description here. The use of the coordinate measuring apparatus on simple workpieces such as a cube having side surfaces which are always parallel to the coordinate directions is simple because the probe first must be positioned only in the region of the particular surface and then is moved only perpendicularly to the particular surface by actuating the corresponding control element (11, 12).

Considerably more complicated is the situation when workpieces or form elements of workpieces must be measured which are aligned so as to be no longer parallel to the coordinate directions. A simple embodiment could be that, for example, the above-mentioned cube is simply tilted by 30° about one of its edges as shown by way of example with the workpiece 15 in FIG. 8 so that the workpiece coordinate system (Xw, Yw, Zw) is rotated relative to the machine coordinate system (X, Y, Z) about the Y axis by an angle gamma of 30°. For such a tilted cube, it would likewise be desirable to be able to move with the probe 6 as before, namely, parallel to the workpiece surfaces. For this purpose, a force (Fx, Fy, Fz) is therefore superposed in the same manner on the control elements (11, 12). This force likewise superposes on the control elements several preferred directions deviating from the coordinate directions and is so selected that the probe unit can be moved along the axes of a coordinate system rotated with respect to the coordinate directions pregiven by the mechanical assembly 33.

How the above is realized will now be explained in detail with respect to FIG. 8. First, the coordinate measuring apparatus is switched over into a mode via a switch (not shown) in which the correspondingly rotated workpiece coordinate directions (Xw, Yw, Zw) are recorded for the workpiece 15. For this purpose, on the cube, three measuring points are scanned on each of three mutually perpendicular surfaces of the cube and, from the scanned measuring points, the three rotational angles (delta, gamma, epsilon) are computed and transmitted to the controller 22 of the control elements (11, 12). The rotational angle delta is the rotational angle of the workpiece coordinate system (Xw, Yw, Zw) relative to the machine coordinate system (X, Y, Z) about the Z axis. The rotational angle gamma is the rotational angle of the workpiece coordinate system (Xw, Yw, Zw) relative to the machine coordinate system (X, Y, Z) about the Y axis. Finally, the rotational angle epsilon is the rotational angle of the workpiece coordinate system (Xw, Yw, Zw) relative to the machine coordinate system (X, Y, Z) about the X axis. The controller 22 then computes the corresponding rotated workpiece coordinate directions (Xw, Yw, Zw) from the angle values (delta, gamma, epsilon) and sets the forces (Fx, Fy, Fz), which are superposed upon the control elements in such a manner that the control elements are shifted in a preferred direction when they are actuated. The preferred direction then corresponds to the workpiece coordinate directions (Xw, Yw, Zw).

Figure 9:
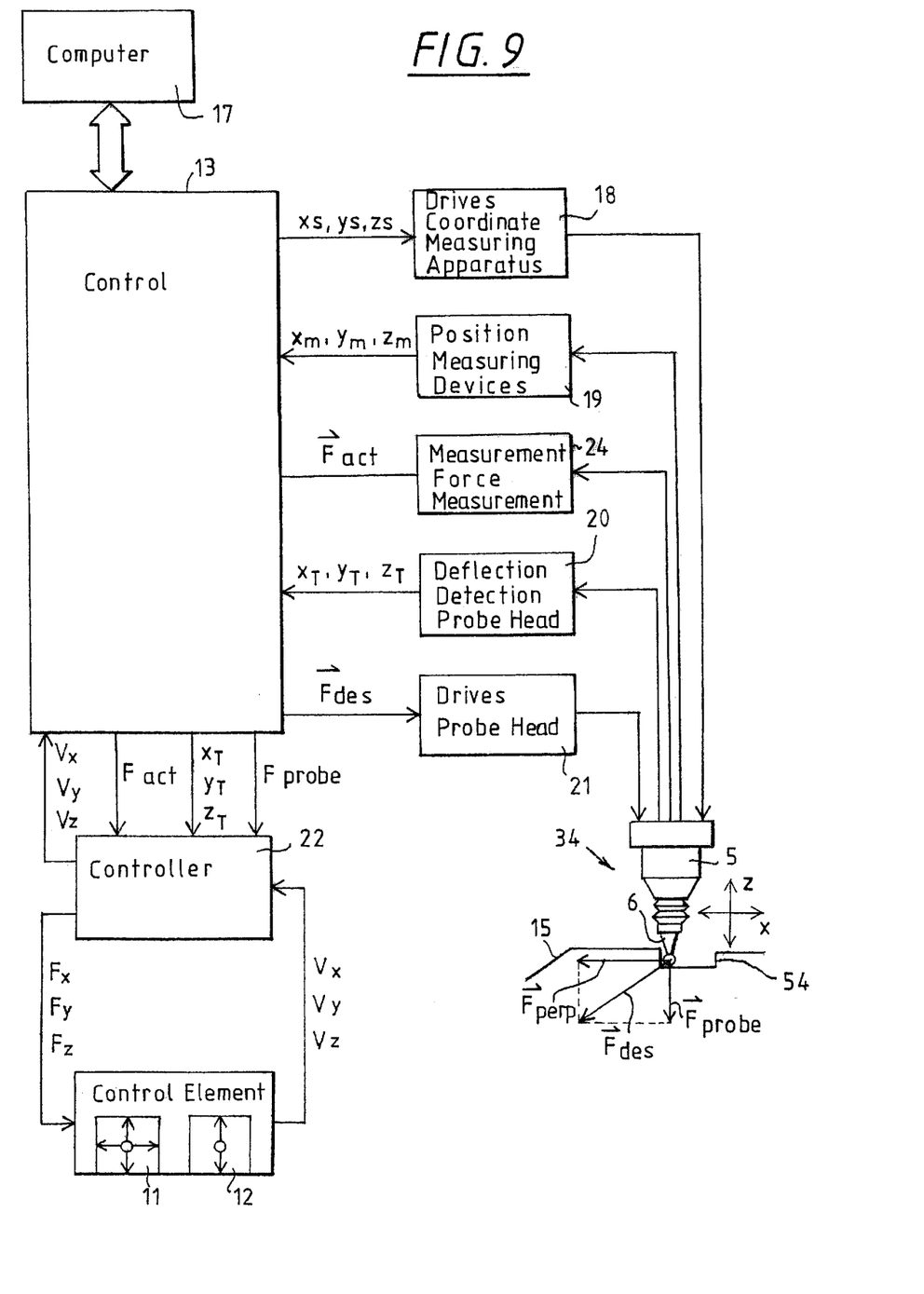

Referring to FIG. 9, a fourth embodiment of a coordinate measuring apparatus control will now be described wherein a measuring probe head 5 having a probe 6 is again used as a probe unit as already described as exemplary in connection with FIG. 4. With measuring probe heads of this kind, it is conventional, as mentioned above, that the probe 6 is charged with a defined measuring force which usually is directed perpendicularly to the surface of the workpiece 15, which is to be measured, at the contact scanning point. This measuring force is either generated by a so-called measuring force generator as shown in connection with FIGS. 4, 8 and 9 or by means of springs which are tensioned when the probe 6 is deflected out of its rest position and thereby generate the measuring force. The measuring force generator is nothing more than an electronic linear motor which generates a certain force in the particular coordinate direction. The perpendicular direction is supplied in the CAD operation conventionally with the points to be scanned on the workpiece surface and is separately adjusted for each point to be scanned. This is, however, not-possible in manual operation, wherein the probe is shifted by means of control elements (11, 12) because the precise direction of the surface is known neither to the coordinate measuring apparatus nor to the operator for each workpiece. The measuring force is here therefore usually superposed in the direction that the probe head 5 is moved on the surface of the workpiece 15 to be measured when placing the probe 6.

If, as shown for example in FIG. 9, the probe head 5 is first positioned forward of the workpiece 15 and the probe head is the moved by the control element 11 vertically perpendicular onto the workpiece surface, then the measuring force $\vec{F}_{probe}$ is likewise superposed on the probe 6 horizontally toward the workpiece. The pregiven measuring force $\vec{F}_{probe}$ is here always charged with a constant magnitude in the Z direction as long as the probe is in contact with the workpiece 15. For this purpose and after contacting the workpiece surface, the probe is bound into the control loop which correspondingly readjusts the drives 18 because of the probe deflection measured by the probe head circuit 20 so that the probe is always in a defined desired position. The constant measuring force is superposed in the contact direction onto the probe 6 so that the probe can no longer be moved further toward the workpiece. A movement of the probe head 5 is, however, possible perpendicular to the scan direction in the coordinate directions (x, y, z).

If the probe head 5 is now, for example, moved in the direction of arrow x, then the probe 6 will at some time get caught on the edge 54 of the workpiece and a probe deflection of the probe 6 relative to the probe head 5 will result in the direction of the coordinate direction x. This deflection of the probe 6 relative to the probe head 5 leads to a measuring force $\vec{F}_{perp}$ in a direction perpendicular to the scanning direction. This measuring force $\vec{F}_{perp}$ is applied either as shown in FIG. 9 by the measuring force generators in order to return the probe 6 to its zero position in the coordinate direction x, or which measuring force $\vec{F}_{perp}$ is generated by the deflection of the probe out of its rest position for the case that the measuring force is developed by means of springs. For the case wherein the probe is a very fine probe (the probe ball of the probe has a diameter of less than 1 mm), the danger is present that the probe will break off when a certain measuring force is exceeded. It is therefore very advantageous when a preferred direction would be superposed onto the control elements (11, 12) for this case which operates such that the deflection between probe 6 and the measuring probe head 5 becomes less when moving in the corresponding direction. This can be realized in that the preferred direction is, in the contacting state, superposed proportional to the measuring forces, which act perpendicularly to the scanning direction.

It will now be shown with respect to FIG. 9 how this is realized.

The measuring force $\vec{F}_{act}$ is measured via the measuring force generators based on the adjusted currents of the measuring force units 24 and transmitted to the controller 22. Furthermore, the component $\vec{F}_{probe}$ effective in the scanning direction is transmitted by the control 13 so that the force component $\vec{F}_{perp}$, which is perpendicular to the scanning direction, can be determined via vector arithmetic. This force component $\vec{F}_{perp}$ is used in the controller 22 in order to superpose a corresponding force (Fx, Fy, Fz) onto the control elements. This force (Fx, Fy, Fz) operates opposite to the force component $\vec{F}_{perp}$. In this way, the operator is always guided in the adjusted preferred direction in such a manner that the operator is again taken away from the edge.

In another embodiment of the invention, a tapping is superposed on control elements, which are not intended to be operated by the operator in the measurement sequence, so that the operator is hereby informed. The circuit is configured, for example, as shown in FIG. 4. In addition, an additional line would be provided between the control 13 and the controller 22. Via this additional line, the control could inform the controller 22 as to the corresponding control elements which are not to be used.

In another embodiment of the invention, the force of the function assembly group is pregiven in such a manner that a stop occurs during a deflection of the control element. The stop is so provided that a probe head, which is provided as a switching probe unit, is moved at an optimal scanning speed. This type of stop or pressure point can arise from the controller 22 when there is a deflection of the control elements (11, 12) by the superposition of a force (Fx, Fy, Fz) for a certain deflection. The circuit would be similar to that in FIG. 6 but without the lines (Xm, Ym, Zm), (Xp, Yp, Zp), (SL) between the control 13 and the controller 22. In lieu thereof, a line would be provided between the control 13 and the controller via which the optimal scanning speed is transmitted to the controller.

In still another embodiment of the invention, the coordinate measuring apparatus has a control element having a pregiven rest position and a measuring probe head with a probe as a probe unit. The force from the function assembly group is pregiven in such a manner that the control element is deflected from its neutral position into the scanning direction as long as the probe contacts the workpiece. This can be achieved with a slight modification of the circuit of FIG. 4. In this case, only a line must be provided between control 13 and controller 22 which transmits the scanning direction to the controller.

In the same manner, in probe heads wherein the force is adjusted via springs, the measuring force $\vec{F}_{act}$ can be determined by the actual probe deflection and processed as described above.

It is also noted that the invention is not limited to the embodiments shown; instead, variations are also covered. For example, different embodiments can be combined with each other.

It is understood that the foregoing description is that of the preferred embodiments of the invention and that various changes and modifications may be made thereto without departing from the spirit and scope of the invention as defined in the appended claims.

What is claimed is:

1. A coordinate measuring apparatus for measuring a workpiece in accordance with a measuring sequence, the apparatus comprising:

a probe unit for scanning said workpiece;

a mechanical assembly for moving said probe unit in three coordinate directions (X, Y, Z);

a plurality of drives for driving said mechanical assembly to move said probe unit;

a manually actuable control element for controlling said drives; and, a force unit for superposing a force onto said control element in correspondence to specific conditions in said measuring sequence.

2. The coordinate measuring apparatus of claim 1, further comprising a controller connected to said force unit for controlling the superposition of said force onto said control element.

3. The coordinate measuring apparatus of claim 2, wherein said force is approximately proportional to the acceleration of said mechanical assembly in the coordinate direction controlled by said control element.

4. The coordinate measuring apparatus of claim 3, wherein said force is selected to be approximately proportional to the mass moment of inertial force occurring because of the acceleration of said mechanical assembly.

5. The coordinate measuring apparatus of claim 3, wherein said force unit is a mass coupled to said control element so as to be accelerated when said control element is actuated.

6. The coordinate measuring apparatus of claim 5, wherein said mass is a rotatable disc or a linearly movably guided body.

7. The coordinate measuring apparatus of claim 6, further comprising a gear assembly for connecting said mass to said control element.

8. The coordinate measuring apparatus of claim 6, wherein said mass is rigidly connected to said control element.

9. The coordinate measuring apparatus of claim 3, further comprising:
   at least one acceleration sensor attached to said mechanical assembly for generating an acceleration signal;
   said control element being adapted to generate a control signal (Vx, Vy, Vz);
   a control connected between said controller and said drives wherein drive signals are derived from said control signal (Vx, Vy, Vz); and,
   said controller functioning to derive the superposed force from one of said acceleration signal, said control signal (Vx, Vy, Vz) or said drive signals.

10. The coordinate measuring apparatus of claim 1, wherein said controller superposes said force onto said control element in such a manner that at least one preferred direction results in which said control element could be preferably actuated when said control element is actuated by an operator.

11. The coordinate measuring apparatus of claim 10, wherein: for a deflection of said control element, said controller superposes said force onto said control element in correspondence to said deflection in such a manner that there results a constant ratio, which corresponds to said preferred direction, between the deflections of said control element for the various coordinate directions.

12. The coordinate measuring apparatus of claim 10, wherein said probe unit is an optical probe head and said preferred direction is pregiven by said controller in such a manner that said robe unit is moved along the scanning beam when said control element is actuated in said preferred direction.

13. The coordinate measuring apparatus of claim 10, further comprising a plurality of said manually actuable control elements; and, wherein: said controller pregives a plurality of preferred directions which are so selected that said probe unit can be moved along the axes of a coordinate system (Xw, Xy, Xz) when said control elements are actuated in said preferred directions; and, said coordinate system (Xw, Xy, Xz) is rotated relative to the coordinate directions (X, Y, Z) pregiven by said mechanical assembly.

14. The coordinate measuring apparatus of claim 10, further comprising a plurality of said manually actuable control elements; and, wherein said probe unit includes a switching probe head and a probe movable relative to said probe head; said controller being adapted to pregive said preferred direction $\vec{U}$ in such a manner that said probe head is moved to the last valid contact position (Xp, Yp, Zp) when said control elements are actuated.

15. The coordinate measuring apparatus of claim 14, wherein said probe has a rest position; and, said controller superposes said preferred direction $\vec{U}$ as long as said probe is deflected out of said rest position.

16. The coordinate measuring apparatus of claim 10, wherein said probe head is movable in a scanning direction and has a measuring probe head having a probe deflectable relative to said probe head; and, said controller selects said preferred direction opposite to the direction of the measuring forces acting perpendicular to said scanning direction.

17. The coordinate measuring apparatus of claim 10, wherein said probe head is movable in a scanning direction and has a measuring probe head having a probe deflectable relative to said probe head; and, said preferred direction is superposed opposite to the measuring force acting on said probe head with said probe being in contact with said workpiece.

18. The coordinate measuring apparatus of claim 2, wherein said controller superposes said force in such a manner that operating said control element becomes noticeable by a tapping sound.

19. The coordinate measuring apparatus of claim 2, wherein said probe unit includes a switching probe head; and, said force is pregiven by said controller in such a manner that, with the deflection of said control element, a stop arises which is so provided that said probe head is moved at optimal scanning speed.

20. The coordinate measuring apparatus of claim 2, wherein said probe unit includes a measuring probe head and a probe; and, said control element has a pregiven rest position; and, said controller pregives said force in such a manner that said control element is deflected out of said rest position in the contact direction as long as said probe contacts said workpiece.

21. The coordinate measuring apparatus of claim 1, wherein said force unit is an electric motor which generates said force.

* * * * *

UNITED STATES PATENT AND TRADEMARK OFFICE
CERTIFICATE OF CORRECTION

PATENT NO. : 6,158,136
DATED : December 12, 2000
INVENTOR(S) : Klaus-Dieter Goetz and Otto Ruck Page 1 of 1

It is certified that error appears in the above-identified patent and that said Letters Patent is hereby corrected as shown below:

Column 12,
Line 62, delete "am" and substitute -- $\alpha$m -- therefor.

Column 13,
Line 43, delete " (Wu, We)" and substitute -- (W$\alpha$, W$\beta$) -- therefor.

Column 14,
Line 64, delete "not-possible" and substitute -- not possible -- therefor.

Column 17,
Line 1, delete "claim 2" and substitute -- claim 1 -- therefor.
Delete lines 24 and 25.
Line 33, delete "one of said acceleration signal,".
Line 34, between "signals" and the period insert -- or of an acceleration signal generated by an acceleration sensor attached in said mechanical assembly --.
Line 51, delete "robe" and substitute -- probe -- therefor.

Signed and Sealed this

Nineteenth Day of February, 2002

Attest:

Attesting Officer

JAMES E. ROGAN
Director of the United States Patent and Trademark Office